INVENTOR.
BERLON A. ROBERTS
BY
*Owen, Wickersham & Erickson*
ATTORNEY

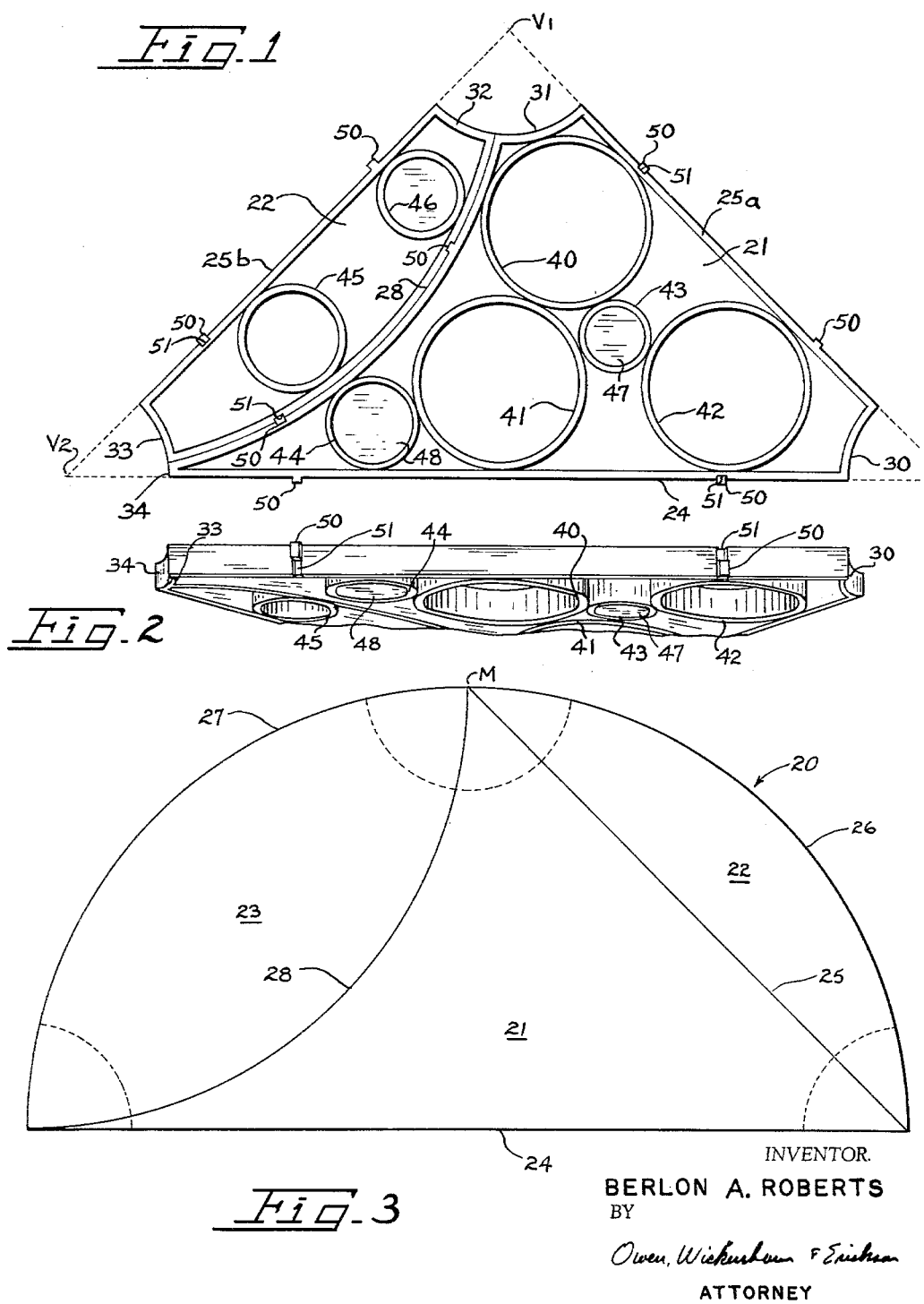

Nov. 2, 1965  B. A. ROBERTS  3,214,874
MODULES FOR MAKING GENERALLY TWO-DIMENSIONAL PATTERNS
Filed July 12, 1962  4 Sheets-Sheet 3

INVENTOR.
BERLON A. ROBERTS
BY
ATTORNEY

Nov. 2, 1965   B. A. ROBERTS   3,214,874
MODULES FOR MAKING GENERALLY TWO-DIMENSIONAL PATTERNS
Filed July 12, 1962   4 Sheets-Sheet 4
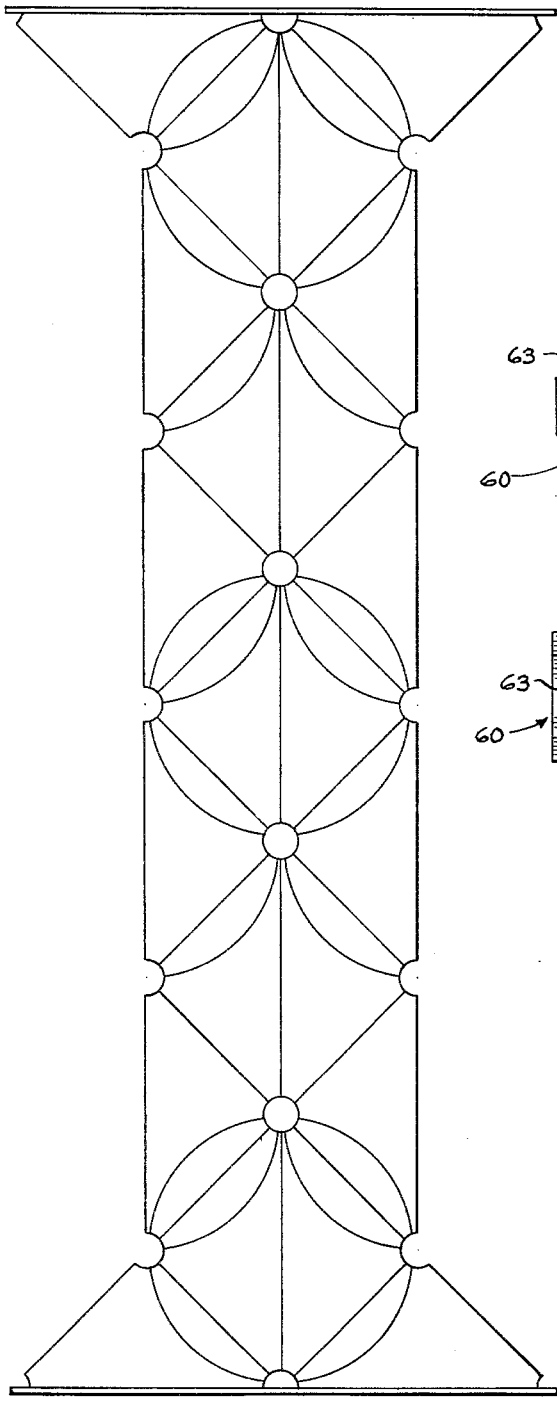
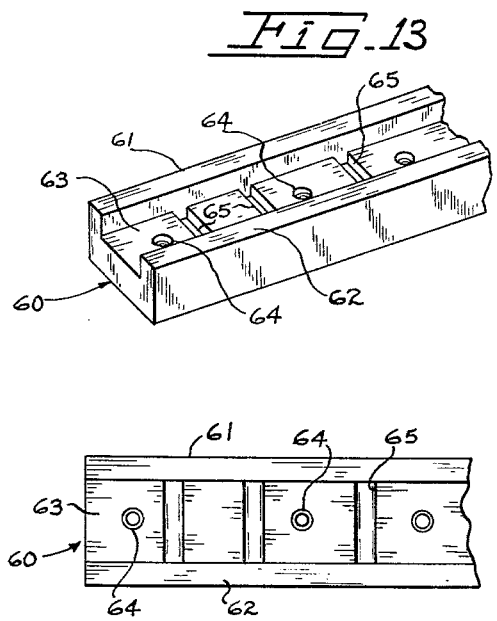
INVENTOR.
BERLON A. ROBERTS
BY
Owen, Wickersham & Erickson
ATTORNEY

# United States Patent Office 3,214,874
Patented Nov. 2, 1965

3,214,874
MODULES FOR MAKING GENERALLY TWO-DIMENSIONAL PATTERNS
Berlon A. Roberts, 1223 Grand Ave., Apt. 3,
San Rafael, Calif.
Filed July 12, 1962, Ser. No. 209,388
12 Claims. (Cl. 52—311)

This invention relates to a set of modules for making generally two-dimensional patterns.

The invention can be used for making divider screens, free-standing panels, or wall panels. The modules may be made of various suitable material, such as molded plastic for indoor use, concrete for outdoor use, ceramic or wood.

One object of the invention is to provide a set of modules for making a wide variety of attractive two-dimensional patterns that are decorative in nature and provide a pleasing aesthetic appearance. Actually, they also give some three-dimensional patterning, but the main effect is two-dimensional.

Another object of the invention is to provide a set of modules having a very small number of unit types but enabling a wide variety of pleasing patterns to be made.

Another object is to provide modules that can easily be assembled by even an unskilled user into many types of structure.

Another object of the invention is to provide a set of modules which can easily be molded from plastic to provide inexpensive units.

Another object of the invention is to provide a set of modules that are strong in structure and self-supporting, and that interlock with each other when assembled.

Other objects and advantages of the invention will appear from the following description of some preferred forms thereof.

In the drawings:

FIG. 1 is a plan view of two basic modules according to the principles of the invention. Broken lines indicate vertices of an isosceles right triangle from which the modules are derived.

FIG. 2 is a fragmentary perspective view of the modules of FIG. 1 looking at the lower edge from below, with the upper portions broken off.

FIG. 3 is a diagrammatic view of a geometric construction showing derivations of a three-module assembly representing a modified form of the invention including the two modules there and a third module which is a duplication of one of the two modules of FIG. 1.

FIG. 12 is a view of a free-standing panel made by using the modules of FIG. 1 and bars of FIG. 10, again simplifying the units to their outlines.

FIG. 13 is a fragmentary enlarged view in perspective of a portion of one of the support rods of FIG. 10 used to give side or base support to the modules and their assembly.

FIG. 14 is a fragmentary enlarged plan view of the same element.

Figure 4:
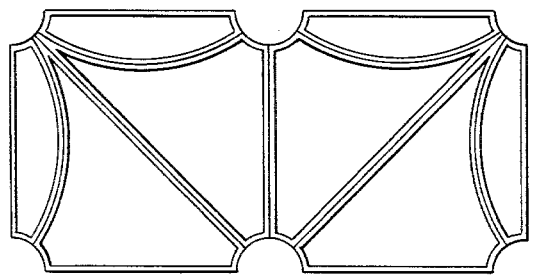
FIG. 4 is a design in the form of two adjacent squares made by using only the modules of FIG. 1, the interior pattern thereof being omitted.

The basis of the modules may be considered as a semicircle (cf. FIG. 3) or as an isosceles right triangle (cf. FIG. 1). Fundamentally, both lead to substantially the same thing, as will be seen by comparison of FIGS. 1 and 3 and also from the following explanation. Looking for a moment at FIG. 3, a semicircle 20 is divided into three elements or modules 21, 22, and 23. The module 21 resembles a triangle with its base 24 the diameter of the semicircle and one side the chord 25 connecting one end of the base 24 to the midpoint $m$ of the arc of the semicircle. The second module 22 is the segment between the chord 25 and the arc 26. On the other half 27 of the arc of the semicircle, the third module 23 is formed and the module 21 completed by a mirror-image of the arc 27—in other words an arc 28 having the same radius as the semicircle and its center $c'$ a point outside the circle equidistant at the radius from the two extremities of the arc 27. The module 23 is, of course, merely a duplication of two of the units 22; so it is not a fundamental unit as such and may be replaced by two units 22.

Considering now FIG. 1, it will also be seen that the modules 21 and 22 may be basically considered as being derived from an isosceles right triangle divided into the two members 21 and 22 by an arc 28 having a radius equal to half the base, drawn from a center equidistant from the vertex $v_1$ of the right angle and one other vertex $v_2$ and at the radius distance therefrom. This is like dividing the chord 25 into sides 25a and 25b.

Preferably, the modules also call for truncating each corner with an inverse circular arc 30, 31, 32, 33, 34, the purpose being to avoid having sharp vertices which would tend to break off. The resulting shape is therefore a structurally sounder unit.

Figure 5:
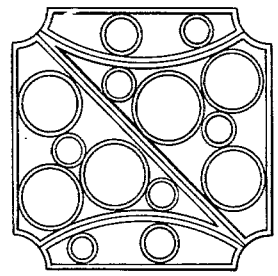
FIG. 5 is a design in the form of a single square using the same modules.
Figure 6:
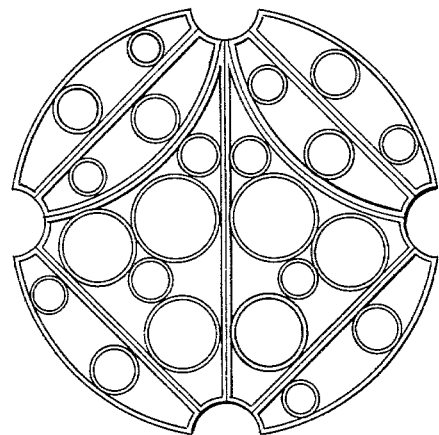
FIG. 6 is a circular configuration made by using only the same modules.
Figure 7:
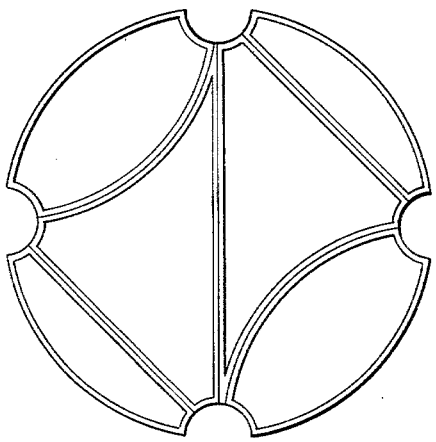
FIG. 7 is a modified form of circular design made by using the modules of FIG. 3, omitting also the interior pattern.
Figure 8:
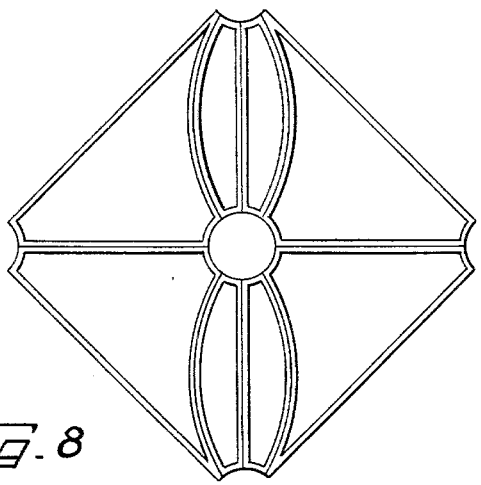
FIG. 8 is a diamond-like design made by using only the two basic modules of FIG. 1, omitting the interior pattern.
Figure 9:
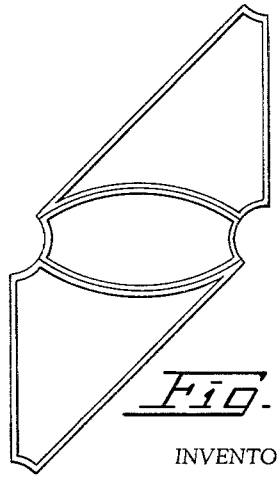
FIG. 9 is another configuration made possible by two of the modules of FIG. 3, omitting the interior pattern.

The adaptability of the two or three units involved is considerable. It will be appreciated that anything made from the three modules 21, 22, 23 of the semicircle 20 can also be made from the two units 21 and 22 of the isosceles right triangle. Thus, the squares of FIGS. 4 and 5 are made from the modules 21 and 22 of FIG. 1 alone. The circle of FIG. 6 can be made by using two modules 21 and six modules 22. Similarly, the circle of FIG. 7 could be made from the same members as FIG. 6 or, as shown by using two each of the modules 21, 22 and 23. The diamond-like figure of FIG. 8 uses four each of the modules 21 and 22. The device of FIG. 9 employs two modules 21 and one module 23.

Figures 10, 11:
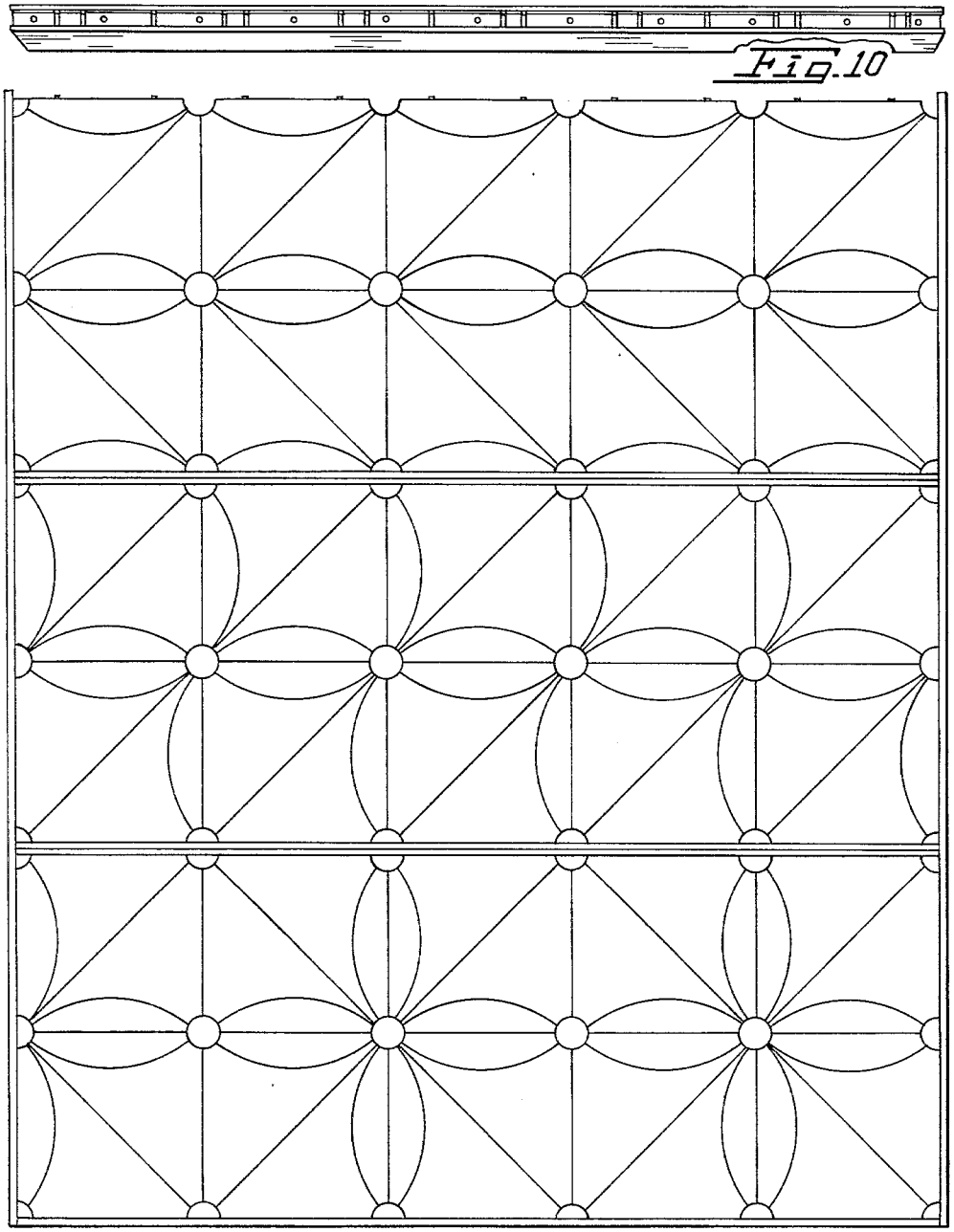
FIG. 10 is a view in perspective of a support bar utilized in assemblies made from the modules.
FIG. 11 is a simplified view in elevation of a door or decorative panel made by using the two basic modules of FIG. 1 and the bar of FIG. 10. Single lines have been used and the interior pattern of the modules omitted, for the sake of showing the basic appearance more clearly and simply.

The door of FIG. 11 and the screen of FIG. 12 are both made from many modules 21 and 22 and these structures illustrate some of the construction possibilities. The over-all pattern may be varied, as shown.

Returning to FIG. 1, it will be seen that the modules preferably include interior decoration also. In this instance the interior decoration comprises a series of circles 40, 41, 42, 43, 45, 46, inscribed in the two basic modules 21 and 22 or tangent to each other or in various other configurations. In place of circles, rectangular lines may be used if desired, and other configurations are, of course, possible. The devices shown in FIG. 1 may be made in any desired size. When molding them in plastic, it is desirable to give strength to have the edge members 24, 25a, 25b, etc. about a tenth of an inch wide, and the modules 21, 22 may be about half an inch wide, as shown in FIG. 2. Pieces 47, 48, etc. of colored material such as colored plastic may be made in the circle form for insertion into any or all of the circular areas 40–46 and may also be inserted into the circles of adjacent panels when the things are assembled.

When assembling the units, it is desirable to use an interlocking pattern, which is shown, the interlocking pattern being made so that when the unit is turned over, it will be symmetrical so that where there is a projection 50 on one member, there will be a female groove 51 in the other member. This enables the design to be made so that it is readily assembled by simply applying cement along the edges and using the interlock to hold the members in place during the cementing. This may be dispensed with in concrete members where the mortar will serve the same function or it may also be dispensed with if the cement is desired, but for rapid construction the interlock is preferred. Thus, there will be a tab 50 on the upper half of one and on the lower half of the other end of the same line and opposite each tab there will be a recess 51 on the other side so that when one member of like construction is turned over, it will coincide with that member. There will be two along each arc or line.

The members are held in place by longitudinal channel bars 60 (see FIGS. 10–14), with side rails 61 and 62 defining a channel 63 between them that is of a size to receive the edges of the modules. The bars 60 are bored to provide screw holes for attachment to major structural members. These members are also provided with notches 65 for receiving projections 50 of the modules along the edges 24, 25a, 25b of the basic module members 21 and 22. They can be cut to any desired length, mounted where desired by screws, and the modules 21, 22 assembled into them. A similar double channel 66 may be used between sections of the designs made from these units.

The modules 21, 22 thus enable structures incorporating squares, circles, triangles, arc-segments, diamonds, and other interesting shapes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A decorative generally planar structure, comprising
a plurality of peripheral frame members of channel-shaped cross section with first interlocking means in their channels,
a plurality of module units, comprising a plurality of identical first module units and a plurality of identical second module units different from and complementary to said first module units,
each module unit having at least one straight edge and one curved edge, the curved edges of said first module units being complementary to the curved edges of said second module units,
said first and second units being complementary segments of an isosceles right triangle,
each said straight edge of all said units being insertable snugly in a said frame member for support thereby,
each said first module unit having second interlocking means on each edge thereof, each said second module unit having third interlocking means on each edge thereof,
said second and third interlocking means on said straight edges being engageable with said first interlocking means and with each other, said second and third interlocking means on said curved edges being interlockable with each other,
whereby structures of various designs may be built from said modules interlocking with each other and interlocking with and supported by said frame members,
some of said module units being inserted snugly in and interlocked with said frame members by said interlocking means, and some of said module units being engaged with and interlocked with each other by their said interlocking means to complete said planar structure in a selected said design.

2. The structure of claim 1 wherein said curved edge is an arc with a radius equal to one-half the length of the side of said isosceles triangle opposite the right angle.

3. The structure of claim 1 wherein each said second and third interlocking means is split midway along the lengthwise centerline of its said edge with one half being a projection and the other half a projection-receiving recess, there being two said interlocking means along each edge equidistant from the center of that edge and with one inverted with respect to the other, and wherein said first interlocking means are recesses that receive said projections whichever way they extend.

4. The structure of claim 1 wherein each said module unit is truncated at each corner by an inverse circular arc.

5. The structure of claim 1 wherein there are a plurality of third module units each comprising two curved edges and no straight edges, both said curved edges being complementary to the curved edges of said first module unit.

6. The structure of claim 1 wherein some said module units have interior decoration therein comprising thin edge members defining the periphery of each of those said module units and connecting members no thicker than said edge members shaped to provide through-open spaces through those said module units.

7. The structure of claim 6 wherein said connecting members are circular portions tangent to edge members and each other.

8. The structure of claim 7 having colored discs inserted in some of said circular portions.

9. A decorative generally planar structure, comprising
a plurality of peripheral frame members of channel-shaped cross section with first interlocking means in their channels, said first interlocking means comprising generally rectangular recesses extending across the inner surface of the web of the channel in pre-selected locations,
a plurality of module units, comprising a plurality of identical first module units and a plurality of identical second module units different from and complementary to said first module units,
each module unit having at least one straight edge and one arcuate edge, the arcuate edges of said first module units being concave and being complementary to the arcuate edges of said second module units, which are convex,
said first and second units being complementary segments of an isosceles right triangle,
any said straight edge of each unit being insertable snugly in a said frame member for support thereby,
each said first module unit having two interlocking means on each edge thereof, each said second module unit having two interlocking means on each edge thereof, each said module unit interlocking means comprising a rectangular stud half the width of the edge of said unit and a rectangular recess in line therewith for the other half of said width, the two interlocking means on each edge of each unit being symmetrically located and disposed,
said studs on said straight edges being engageable in a recess of said first interlocking means and in a recess of another module unit interlocking means, said studs and recesses on said arcuate edges being interlockable with those on the arcuate edges of other said units, whereby structures of various designs may be built from said modules interlocking with each other and interlocking with and supported by said frame members, some of said module units being inserted snugly in and interlocked with said frame members by means of their said interlocking means, and the rest of said module units being engaged with and interlocked with each other by their said interlocking means, some of said module units being interlocked with both frame members and other module units to provide an assembled structure.

10. The structure of claim 9 wherein each said module unit is truncated at each corner by an inverse circular arc.

11. A decorative generally planar structure, comprising
- a plurality of peripheral frame members of channel-shaped cross section with first interlocking means in their channels,
- a plurality of module units, comprising a plurality of identical first module units, a plurality of identical second module units different from and complementary to said first module units, and a plurality of identical third module units different from both said first and second module units and complementary to said first module unit,
- each module unit having at least one arcuate edge, the arcuate edges of said first module units being complementary to the curved edges of said second and third module units, said third module unit having two convexly opposite curved edges and said second module unit having one curved edge identical to both curved edges of said third module unit and one straight chordal edge, the curved edge of said first module unit being concave and said first module unit having two straight edges inclined at an angle of 45° relative to each other,
- said first and second units being complementary segments of an isosceles right triangle, said first, second, and third units being complementary segments of a semicircle,
- each said straight edge of each unit being insertable snugly in a said frame member for support thereby,
- each said module unit having second interlocking means on each edge thereof,
- said second interlocking means on said straight edges being engageable with said first interlocking means and with other said second interlocking means, said second interlocking means on said curved edges being interlockable with each other, whereby structures of various designs may be built from said modules interlocking with each other and interlocking with and supported by said frame members,
- some of said module units being inserted snugly in and interlocked with said frame members by means of their said interlocking means, and the rest of said module units being engaged with and interlocked with each other by their said interlocking means, some of said module units being interlocked with both frame members and other module units to provide an assembled structure.

12. The structure of claim 11 wherein each said module unit is truncated at each corner by an inverse circular arc.

References Cited by the Examiner

UNITED STATES PATENTS

| | | | |
|---|---|---|---|
| 255,210 | 5/82 | Tiffany | 52—308 |
| 529,719 | 11/94 | Eils | 52—663 |
| 888,530 | 5/08 | Pugh | 52—590 |
| 1,568,252 | 1/26 | Strub | 46—24 |
| 2,043,445 | 6/36 | Oxhandler | 52—601 X |
| 2,238,355 | 4/41 | Whitenack | 52—601 |
| 2,891,397 | 6/59 | Hauer | 52—308 |
| 3,058,266 | 10/62 | Harvey | 52—663 |

FOREIGN PATENTS

| | | |
|---|---|---|
| 87,185 | 2/22 | Austria. |
| 976,356 | 10/50 | France. |
| 601,532 | 8/34 | Germany. |

FRANK L. ABBOTT, *Primary Examiner.*

HENRY C. SUTHERLAND, *Examiner.*